United States Patent Office 3,220,997
Patented Nov. 30, 1965

3,220,997
METAL-TRANSITION METAL HALIDE OLEFIN POLYMERIZATION CATALYSTS MODIFIED BY THE PRESENCE OF AN ARSINE OR STIBINE
Harry W. Coover, Jr., and Newton H. Shearer, Jr., Kingsport, Tenn., assignors to Eastman Kodak Company, Rochester, N.Y., a corporation of New Jersey
No Drawing. Filed Dec. 3, 1963, Ser. No. 327,795
The portion of the term of the patent subsequent to Aug. 30, 1977, has been disclaimed and dedicated to the Public
11 Claims. (Cl. 260—93.7)

This application is a continuation-in-part of one copending application Serial No. 724,905, filed March 31, 1958, and now abandoned.

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high crystallinity and a high density using a particular catalyst combination which has unexpectedly improved catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000 to 1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalyst ordinarily depends upon certain specific catalyst combinations, and the results are ordinarily highly unpredictable, since relatively minor changes in the catalyst combination often lead to liquid polymers rather than the desired solid polymers.

Certain metals have been used in conjunction with inorganic halides to produce high molecular weight polyethylene. Thus, such metals when used in conjunction with titanium tetrachloride permit a low temperature, low pressure polymerization of ethylene to highly crystalline product. When these catalysts are employed to polymerize propylene and higher α-monoolefins, the resulting polymeric product contains large amounts of oils and greases instead of the desired high molecular weight, crystalline product. Obviously, such results are unsatisfactory when a crystalline polymer is the desired product, and it is one of the purposes of this invention to overcome the undesirable results obtained when prior art catalysts are used.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpectedly improved catalytic activity for the polymerization of propylene and higher α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a metal selected from the group consisting of sodium, lithium, potassium, magnesium and zinc, a halide of a metal selected from the group consisting of titanium and vanadium, the halogen atoms being selected from the group consisting of chlorine, bromine and iodine, and a compound of a Group VA element having the formula $R_3Z$ wherein Z is selected from the group consisting of arsenic and antimony and each R is selected from the group consisting of hydrogen and hydrocarbon radicals containing 1 to 12 carbon atoms and selected from the group consisting of alkyl, aryl and aralkyl. Among these hydrocarbon radicals are methyl, ethyl, propyl, butyl, octyl, dodecycl, phenyl, phenylethyl and napthyl. In the Group VA compound the three radicals represented by R can be the same or different. The improved catalytic activity of this mixture was wholly unexpected, particularly since mixtures containing only the metals and the metal halides described above produce large amounts of comparatively low molecular weight products in the polymerization of propylene and higher olefins. The inventive process can be carried out in liquid phase in an inert organic liquid and preferably an inert liquid hydrocarbon vehicle, but excellent results can be obtained without using a solvent. The process proceeds with excellent results over a temperature range of from 10° C. to 250° C. although it is preferred to operate at a temperature of at least 55° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves both as a liquid reaction medium and as a solvent for the solid polymerization products at the temperature of polymerization.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are particularly useful for polymerizing propylene to form a crystalline, high density polymer. The polypropylene produced has a softening point above 155° C. and a density of 0.91 and higher. Usually the density of the polypropylene is of the order of 0.91 to 0.92.

The polypropylene, polybutenes and polystyrene and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process. Other poly-α-olefins as well as copolymers of ethylene and propylene can also be prepared and have similarly improved properties.

As has been indicated above, the improved results obtained in accordance with this invention depend upon the particular catalyst combination. Thus, one of the components of the catalyst is a metal selected from the group consisting of sodium, lithium, potassium, magnesium and zinc. Another component of the catalyst composition is a halide, for example a tetrahalide or trihalide, of a transition metal selected from the group consisting of titanium and vanadium, the halogen atoms being selected from the group consisting of chlorine, bromine and iodine. The third component of the catalyst composition is a compound of a Group VA element having the structural formula $R_3Z$ wherein Z is a Group VA element selected from the group consisting of arsenic and antimony. Each R is either hydrogen or a hydrocarbon radical as defined hereinabove and preferably a lower alkyl containing 1 to 4 carbon atoms or phenyl. In this third component the R radicals can be the same but in some instances it is desirable to employ different radicals within the definition set forth above. Among the specific compounds that can be used are tributyl arsine, triethyl stibine, tributyl stibine, trioctyl arsine, triphenyl arsine, triphenyl stibine and the like.

The limiting factor in the temperature of the process appears to be the decomposition temperature of the catalyst. Ordinarily, temperatures from 50° C. to 150° C. are employed, although temperatures as low as 0° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution process it is preferred to use a concentration from about 2 to about 10% by weight based on the weight of the vehicle, and for a slurry type of process higher concentrations, for example 40% and higher, are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The molar ratio of metal to transition metal halide can be varied within the range of 1:0.5 to 1:2, and the molar ratio of transition metal halide to the third component of the catalytic mixture can be varied within the range of 1:1 to 1:0.1, but it will be understood that higher and lower molar ratios are within the scope of this invention. A particularly effective catalyst contains one mole of transition metal halide and 0.25 mole of the third component per mole of metal. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or a cycloalkane such as pentane, hexane, heptane or cyclohexane, or a hydrogenated aromatic compound such as tetrahydronaphthalene or decahydronaphthalene, or a high moelcular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing propylene and other α-monoolefins in accordance with this invention is a mixture of sodium, titanium trichloride and tributyl stibine. The importance of the various components of this reaction mixture is evident from the fact that in polymerizing propylene a mixture of sodium and titanium tetrachloride is ineffective for polymerizing propylene to form solid, crystalline polymer. However, when the above stibine or other third component within the scope of this invention is added to the mixture the resulting catalyst composition is highly effective for polymerizing propylene to form a highly crystalline high density polymer. Similarly, when propylene is polymerized in the presence of a mixture of lithium and titanium tetrachloride, the catalyst is effective for producing crystalline polymer only at comparatively high temperatures. The catalysts of this invention are effective for producing excellent yields of crystalline polymer at considerably lower temperatures.

The invention is illustrated by the following examples of certain preferred embodiments thereof.

*Example 1*

In a nitrogen-filled dry box a dry 280 ml. stainless steel autoclave was loaded with 50 ml. of dry heptane, a 1.5 gram charge of catalyst having a 1:1 molar ratio of sodium and titanium tetrachloride. The autoclave was capped, removed from the dry box, and placed in a rocker. 100 ml. (51 grams) of propylene was added. The mixture was rocked, heated to 200° C. and maintained there for four hours. No solid polypropylene was formed.

*Example 2*

The process of Example 1 was followed, and to the catalyst was added tributylarsine to produce a catalytic mixture having a 1:1:0.25 molar ratio. In 4 hours, 14.3 grams of highly crystalline polypropylene was obtained.

*Example 3*

The process of Example 1 was followed using a 2-gram catalyst charge having a 1:1:0.25 molar ratio of sodium (finely divided), vanadium tetrachloride and triphenylarsine. The polymerization was carried out at 55° C. for 8 hours to form 24.9 grams of highly crystalline polypropylene having a density of 0.92 and an inherent viscosity of 2.81.

Equimolar quantities of finely divided magnesium or zinc, when used in place of sodium, also gave good yields of highly crystalline polypropylene.

*Example 4*

The process of Example 1 was followed omitting the heptane solvent and using 1.5 grams of catalyst having a 1:1:0.1 molar ratio of lithium, titanium tetrachloride and tributylstibine. With a polymerization temperature of 180° C. for 4 hours, 17.2 grams of highly crystalline polypropylene was obtained having a density of 0.919 and an inherent viscosity of 2.17.

When the tributylstibine was replaced by triphenylstibine, a good yield of highly crystalline polypropylene was also obtained.

*Example 5*

The process of Example 1 was followed using 0.75 gram of catalyst having a 1:2:2 molar ratio of potassium, titanium tetrabromide and tribenzylarsine. Polymerization at 175° C. for 4 hours produced 28.3 grams of highly crystalline polypropylene.

*Example 6*

The process of Example 1 was followed using 0.5 gram of catalyst having a 1:1:0.1 molar ratio of potassium, titanium trichloride and tridodecylstibine. Polymerization at 150° C. produced 17.1 grams of highly crystalline polypropylene.

*Example 7*

The process of Example 1 was followed using 1.5 grams of catalyst having a molar ratio of 1:1:0.25 of lithium, vanadium trichloride and trioctylstibine. No solvent was used and the monomer was 3-methyl-1-butene. At 175° C., 20.4 grams of highly crystalline poly-3-methyl-1-butene were produced.

*Example 8*

Using the processes of Example 3, highly crystalline solid polyolefins are obtained in good yield using the following olefins: 1-butene, 1-pentene, 4-methyl-1-pentene, styrene, fluorostyrene and vinylcyclohexane.

Thus, by means of this invention polyolefins such as polypropylene are readily produced using a catalyst combination that has been found to have unexpected activity for producing highly crystalline polymer in excellent yields. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, the polypropylene prepared in the presence of catalyst combination within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example by washing with water or lower aliphatic alcohols, such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with polymerizable α-monoolefin.

Although the invention has been described in considerable detail with reference to certain preferred embodiments thereof, variations and modifications can be affected within the spirit and scope of this invention as described hereinabove and as defined in the appended claims.

We claim:

1. In the polymerization of α-olefinic hydrocarbon material to form solid, crystalline polymer, the improvement which comprises catalyzing the polymerization with a catalytic mixture containing a metal selected from the group consisting of sodium, lithium, potassium, magnesium and zinc, a halide of a transition metal selected from the group consisting of titanium and vanadium, the halogen being selected from the group consisting of chlorine, bromine and iodine, and a compound of a Group VA element having the formula $R_3Z$ wherein Z is a Group VA element selected from the group consisting of arsenic and antimony and each R is a radical selected from the group consisting of hydrogen and hydrocarbon radicals containing 1 to 12 carbon atoms selected from the group consisting of alkyl, aryl and aralkyl.

2. In the polymerization of propylene to form solid, crystalline polymer, the improvement which comprises effecting the polymerization in the presence of a catalytic mixture of an alkali metal, titanium trichloride and a compound of a Group VA element having the formula $R_3Z$ wherein Z is a Group VA element selected from the group consisting of arsenic and antimony and each R is a radical selected from the group consisting of hydrogen and hydrocarbon radicals containing 1 to 12 carbon atoms selected from the group consisting of alkyl, aryl and aralkyl.

3. In the polymerization of propylene to form solid, crystalline polymer, the improvement which comprises effecting the polymerization in liquid dispersion in an inert organic liquid and in the presence of a catalytic mixture of sodium, titanium trichloride and a compound of a Group VA element having the formula $R_3Z$ wherein Z is a Group VA element selected from the group consisting of arsenic and antimony and each R is a radical selected from the group consisting of hydrogen and hydrocarbon radicals containing 1 to 12 carbon atoms and selected from the group consisting of alkyl, aryl and aralkyl.

4. The method according to claim 3 wherein tributyl stibine is the compound of a Group VA element.

5. The method according to claim 3 wherein triphenyl arsine is the compound of a Group VA element.

6. The method according to claim 3 wherein triphenyl stibine is the compound of a Group VA element.

7. In the polymerization of propylene to form solid, crystalline polymer, the improvement which comprises effecting the polymerization in liquid dispersion in an inert liquid hydrocarbon vehicle and in the presence of a catalytic mixture having a molar ratio of sodium and titanium tetrachloride of 1:0.5 to 1:2 and a molar ratio of titanium trichloride and triphenyl stibine within the range of 1:1 to 1:0.1 at a temperature of 55 to 250° C. and a pressure within the range of atmospheric to 20,000 p.s.i.

8. As a composition of matter, a polymerization catalyst containing a metal selected from the group consisting of sodium, lithium, potassium, magnesium and zinc, a halide of a transition metal selected from the group consisting of titanium and vanadium, the halogen being selected from the group consisting of chlorine, bromine and iodine, and a compound of a Group VA element having the formula $R_3Z$ wherein Z is a Group VA element selected from the group consisting of arsenic and antimony and each R is a radical selected from the group consisting of hydrogen and hydrocarbon radicals containing 1 to 12 carbon atoms selected from the group consisting of alkyl, aryl and aralkyl.

9. As a composition of matter, a polymerization catalyst containing an alkali metal, titanium trichloride and a compound of a Group VA element having the formula $R_3Z$ wherein Z is a Group VA element selected from the group consisting of arsenic and antimony and each R is a radical selected from the group consisting of hydrogen and hydrocarbon radicals containing 1 to 12 carbon atoms selected from the group consisting of alkyl, aryl and aralkyl.

10. As a composition of matter, a polymerization catalyst containing sodium, titanium trichloride and a compound of a Group VA element having the formula $R_3Z$ wherein Z is a Group VA element selected from the group consisting of arsenic and antimony and each R is a radical selected from the group consisting of hydrogen and hydrocarbon radicals containing 1 to 12 carbon atoms and selected from the group consisting of alkyl, aryl and aralkyl.

11. As a composition of matter, a polymerization catalyst containing a molar ratio of sodium and titanium trichloride of 1:0.5 to 1:2 and a molar ratio of titanium trichloride and triphenyl stibine within the range of 1:1 to 1:0.1 at a temperature of 55 to 250° C. and a pressure within the range of atmospheric to 20,000 p.s.i.

References Cited by the Examiner

UNITED STATES PATENTS

| 2,996,459 | 8/1961 | Andersen et al. | 260—94.9 |
| 3,072,629 | 1/1963 | Coover et al. | 260—94.9 |

FOREIGN PATENTS

| 538,782 | 6/1955 | Belgium. |

JOSEPH L. SCHOFER, *Primary Examiner.*